United States Patent
Fowler

[15] 3,700,373
[45] Oct. 24, 1972

[54] CHEESE MOLD APPARATUS
[72] Inventor: Dean A. Fowler, Smithfield, Utah
[73] Assignee: Cache Valley Dairy Association, Smithfield, Utah
[22] Filed: June 1, 1970
[21] Appl. No.: 42,343

[52] U.S. Cl. ................425/195, 425/89, 425/356
[51] Int. Cl. ............................................A01j 25/15
[58] Field of Search .......31/44, 46, 89; 249/112, 113

[56] References Cited

UNITED STATES PATENTS

| | | | |
|---|---|---|---|
| 2,266,336 | 12/1941 | Royer | 31/46 |
| 3,199,195 | 8/1965 | DeBoer | 31/44 |
| 2,982,661 | 5/1961 | Thompson | 31/44 X |
| 2,193,013 | 3/1940 | Weinberg | 31/44 X |
| 3,514,857 | 6/1970 | Rossen | 31/44 |
| 3,095,647 | 7/1963 | Rossen | 31/44 |

*Primary Examiner*—Hugh R. Chamblee
*Attorney*—David V. Trask, C. Harvey Gold and William S. Britt

[57] ABSTRACT

A rectangular cheese hoop is constructed to conform generally in outside dimensions, assembly and operation to a conventional block cheese hoop. If desired, a block cheese hoop may be modified by the insertion of novel adapters. The adapters (or equivalent horn hoop structures) are in the form of platen members, each of which carries at least one, preferably two, concave molds shaped as longitudinal sections of a cylinder. The horn cheese hoop is loaded with curd and pressed in the fashion conventional with block cheese hoops. Thus, pressing is in a direction normal the axis of the fully pressed horn.

4 Claims, 10 Drawing Figures

PATENTED OCT 24 1972

INVENTOR.
Dean A. Fowler
BY David V. Trask
His Attorney

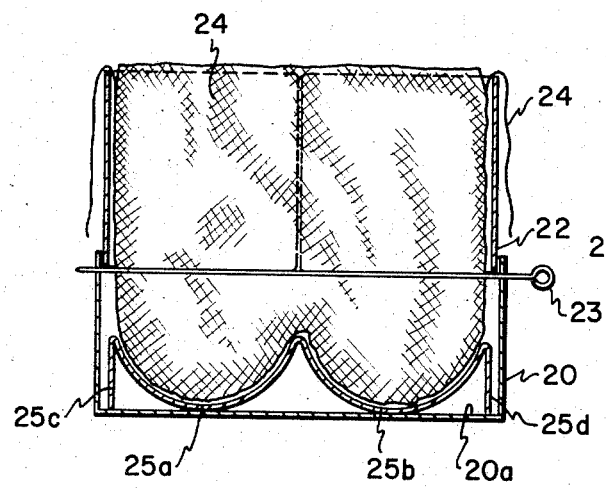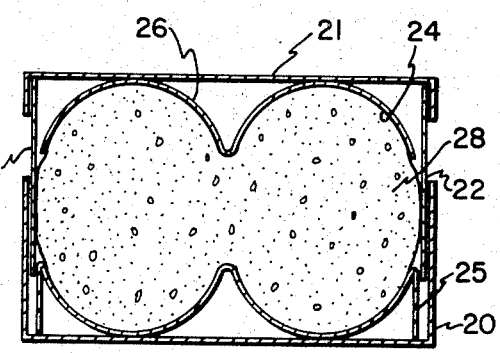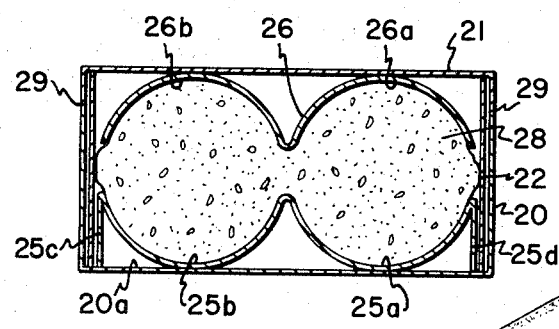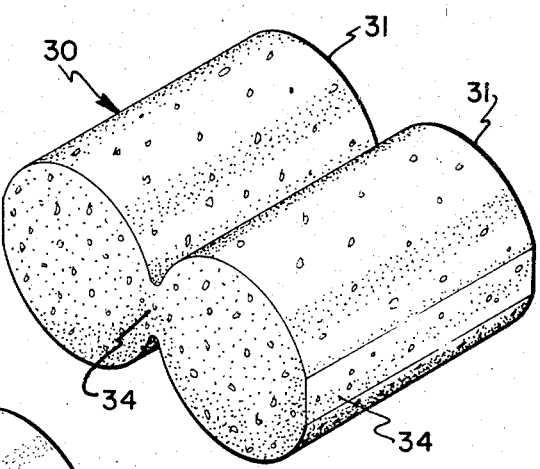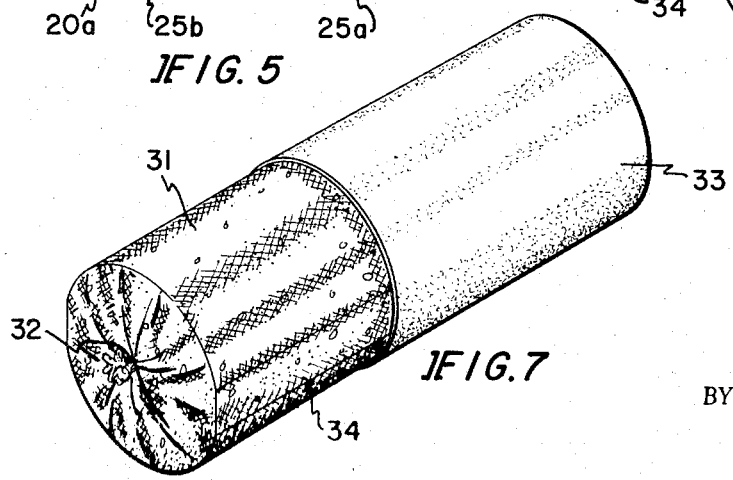

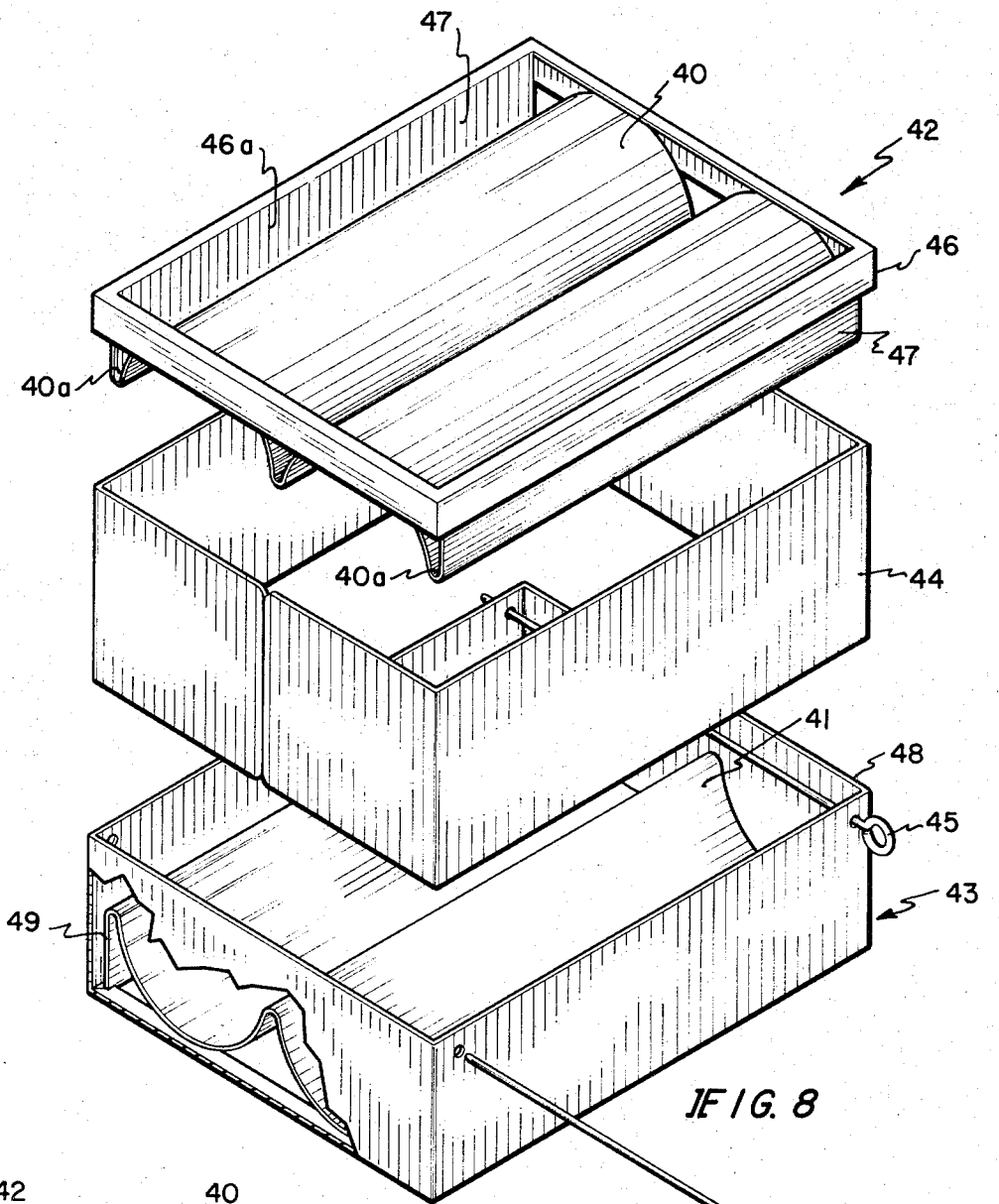
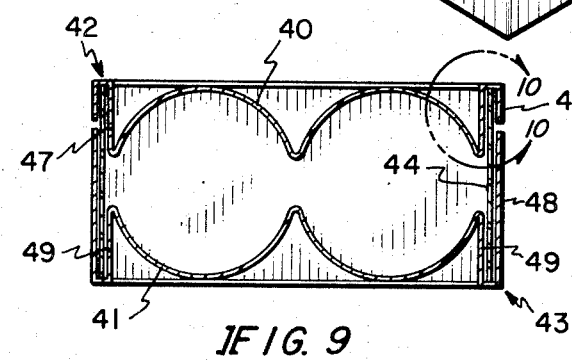
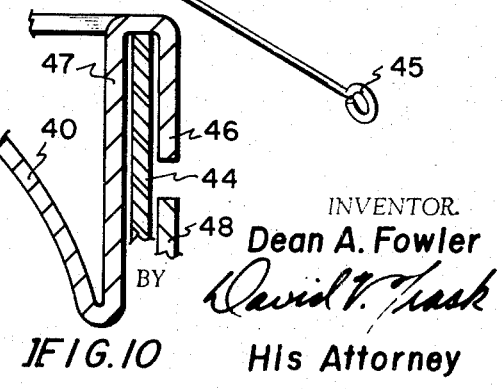
INVENTOR.
Dean A. Fowler
BY David V. Trask
His Attorney

CHEESE MOLD APPARATUS

BACKGROUND OF THE INVENTION

Field

This invention relates to the production of horns of cheese and provides both novel methods and apparatus therefor.

State of the Art

Horn cheeses have long enjoyed a preference over block cheeses in the marketplace. This preference is reflected in the higher per pound price that consumers are willing to pay for horn cheeses compared to directly competitive block cheeses. For example, longhorn cheddar cheese has traditionally sold for a higher price than block cheddar cheese.

The classical method for preparing longhorn cheese involves the preparation of curd according to the same procedure generally used for the preparation of American varieties of cheese, notably cheddar, Monterrey and Colby cheeses. The curd is then loaded into individual horn hoops which are lined with cheesecloth. Classical horn hoops are approximately cylindrical, but they are beveled slightly to facilitate the removal of pressed cheeses and to permit nesting of the hoops during the pressing procedure. Typically, a circular hoop is about 15 inches in length and tapers from a maximum diameter at its mouth or open end of about 6 ½ inches to a minimum diameter at its bottom or closed end of about 5 ½ inches. Special cheesecloth liners (press cloths) must be provided for use in this shape of hoop.

After the horn hoops are filled with curd to the appropriate height, the cheesecloth is folded over the top of the curd, and the bottom of one hoop is nested into the mouth of another hoop. A series of hoops nested in this fashion is placed in a press, and pressure is applied to the series by forcing the hoop at one end of the series toward the hoop at the opposite end of the series. This method produces individual horn cheeses of approximately cylindrical shape. The horns are removed from the hoops, unwrapped from the cheesecloth, rewrapped in suitable wrapping material, such as paper, vinyl, or other types of plastic, and are stood on end within a cylindrical sleeve, e.g., of cardboard, for aging. During the aging process, the cheese acquires a substantially cylindrical configuration because of its natural tendency to creep until restrained by the cylindrical sleeve in which it is stored.

The aforedescribed classical method results in the discharge of a portion of the cheese curd from the mouth of each hoop during the pressing operation. This curd must be trimmed away and salvaged, usually at a substantially reduced return. Moreover, the overall horn cheese making process requires separately handling each individual horn hoop and cheese.

In most cheese making operations, the major portion of cheese curd processed is pressed into blocks. To the extent practical, a cheese plant uses automated washing equipment to clean its cheese hoops. The individual horn hoops are difficult to clean and cannot be handled efficiently in the automated washing equipment relied upon for washing block cheese hoops. Moreover, the special cheesecloths required for the horn hoops of the prior art must be separately maintained and cleaned.

Generally, a cheese operation is designed to coordinate its vat capacity (where curd is produced) with its press capacity. The presses are typically designed to accommodate the number of rectangular block cheese hoops required to press the curd from an integral number of vats. It is not practical to press blocks and horns simultaneously in a single press. As a consequence, when horns are produced the press capacity is not well coordinated with the associated vat capacity.

Because of the aforementioned difficulties, many cheese producers cannot economically justify the production of horns of cheese. Some cheese producers follow the practice of cutting semi-cylindrical shapes from blocks produced in conventional block cheese processes. Mechanically cut horns have enjoyed neither the consumer acceptance nor the price differentials of conventional horn cheeses. The production of horns by cutting produces a large percentage of waste. In an effort to reduce this waste, some producers cut shapes which deviate substantially from the traditional horn shape. Moreover, producing horns by cutting techniques is only practical for large cheese producers who have a ready use, e.g., cheese spreads and the like, for the scrap remaining from the cutting operation. Small and intermediate cheese producers have a substantial need for an improved method for producing horns of American variety cheeses.

SUMMARY OF THE INVENTION

According to the present invention, cheese horns are pressed in rectangular horn cheese hoops shaped and dimensioned externally approximately the same as conventional rectangular block cheese hoops. The horn cheese hoops of this invention may include parts which are interchangeable with the block cheese hoops used in the same cheese plant, but ordinarily it is more convenient for the hoop structures used for the production of horns to be maintained and stored as complete sets. It is possible to load the rectangular horn hoops of this invention interchangeably with rectangular block hoops in a press to produce simultaneously both horns and blocks, thereby avoiding many of the previously described difficulties and inconveniences. The method and apparatus of the present invention provide significant savings on labor, and equipment required to produce horns of cheese. One notable economic advantage provided by this invention is that the automated washing equipment conventionally employed for washing block hoops is satisfactory for washing the rectangular horn cheese hoops of this invention. Horns are produced with much less loss of curd during the pressing procedure.

In addition to providing an improved procedure and equipment for producing horns, the apparatus and method of this invention makes it practical to press a great variety of specially shaped cheeses without the waste associated with cutting such shapes from block cheeses. Accordingly, many of the shapes heretofore impractical for most cheesemakers to produce are now economically feasible products.

The apparatus of this invention is used in accordance with procedures generally followed in the production of block cheeses in a rectangular block cheese hoop, such as the standard "40 pound hoop" conventionally used in the cheese making industry. According to some embodiments, such a standard rectangular block hoop is modified by the insertion of adapters. These adapters may be formed as insertable platens, one of which is positioned in the bottom of the hoop prior to insertion of the cloth and sleeve portions of the conventional hoop and the other of which is inserted in opposition to the first insert atop the cheesecloth after it is folded over the curd. The top of the rectangular hoop is then positioned in conventional fashion. Each platen has a pressing surface comprised of at least one, usually two, concave molds.

An alternative and preferred embodiment of the invention is constructed by mounting the aforementioned adapters (platen members) in rectangular frames having perimeters substantially identical to those of the bottom and top members of the standard rectangular block hoops. These frames are substituted for the bottom and top members to make up a rectangular horn hoop. The use of the rectangular horn hoops then involves no operating procedures in addition to those normally followed in the use of conventional rectangular block hoops.

Although the pressing surface of the platen members may include any desired number and shape of concave molds, the molds of most interest presently are longitudinal cylindrical sections extending the full length of the pressing surface and dimensioned to produce horns of approximately the diameter produced in cylindrical horn hoops.

Many aspects of quality control and uniformity of product are enchanced by the improved method provided by this invention. Thus, contrary to the procedures of the prior art, the horns of this invention are produced by pressing a predetermined quantity of curd into an approximately cylindrical shape of predetermined volume by applying pressure across a much greater surface area than is the case when curd is pressed in a cylindrical horn hoop. When the aforementioned platen members are urged together, pressure is applied in opposing directions normal the longitudinal axis of the pressed horn, rather than parallel to said longitudinal axis. It is generally desirable, from the standpoint of uniformity of quality and shape, to press curd in this fashion rather than in accordance with the classical method wherein it is necessary to rely to a substantially greater extent upon the flow characteristics of the curd to assume the shape of the mold.

Although the platen inserts may include any convenient number of concave molds, rectangular horn hoops corresponding in dimensions to the standard "40 pound" rectangular block hoops are appropriately dimensioned to receive platens containing two side-by-side concave molds. Each concave mold is desirably shaped generally as a longitudinal cylindrical section of no more than semi-cylindrical volume. That is, each mold is shaped as the volume defined by a plane intersecting the cylinder parallel its longitudinal axis. Each such longitudinal section should be no larger than, and preferably somewhat smaller than, a section defined by a plane intersecting the longitudinal axis of the cylinder. It is recognized that the precise shape of the molds used to produce horns need only approximate a cylindrical section. Subsequent aging procedures permit smoothing of the surface of the pressed horn, due to the natural flow characteristics of the cheese. Thus, although it is generally most convenient to manufacture molds by simply rolling sheet material into a curved plane defining substantially circular arcs in cross section, it is possible for the mold to deviate substantially from a circular curvature and still produce a pressed shape suitable for horn production. The mold may even by polygonal in cross section, provided the pressed horns do not deviate so substantially from a cylindrical shape as to exceed the ability of the pressed curd to flow into a cylindrical shape during the aging process.

BRIEF DESCRIPTION OF THE DRAWINGS

In the drawings which illustrate what is presently regarded as the best mode for carrying out the invention.

FIGS. 3, 4 and 5, cross sectional views of the embodiment illustrated by FIG. 2, serially illustrating the mode of operation thereof;

FIG. 6, a pictorial illustration of a pair of pressed horns produced in accordance with this invention;

FIG. 7, a pictorial illustration of a pressed horn being prepared for aging;

FIG. 8, a pictorial exploded illustration, partially cut away, of an alternative embodiment of the apparatus of this invention;

FIG. 9, a cross sectional view of the apparatus of FIG. 8 in assembled, fully pressed condition; and FIG. 10, a fragmentary section in enlarged scale of the region 10—10 of FIG. 9.

DESCRIPTION OF THE ILLUSTRATED EMBODIMENTS

Figure 1:
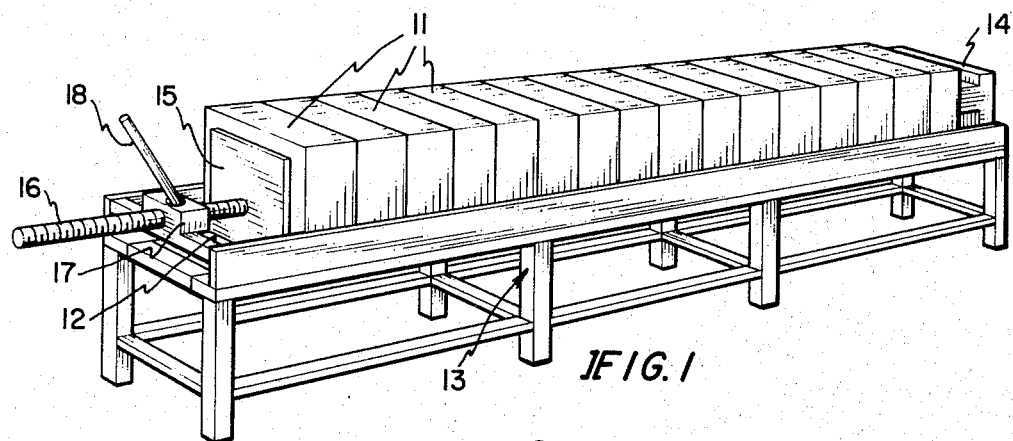
FIG. 1 is a pictorial illustration of a plurality of rectangular hoops loaded in a conventional cheese press.

As is illustrated by FIG. 1, the rectangular horn hoops of the present invention may be pressed in a conventional cheese press in the same fashion as the rectangular block hoops of the prior art. A plurality of rectangular hoops 11 of either type may be placed in the trough 12 of a conventional cheese press 13. Force is applied to the hoops 11 between a stationary foot 14 and a ram 15 (which may be urged toward the foot 14 by any convenient mechanical means) to compress curd contained by the hoops.

In the illustrated instance, the ran 15 is moved by means of a threaded shaft 16 journalled to turn in a box 17. Mechanical means (not shown) in the box 17 may be driven by pneumatic fluid supplied through a line 18. The pressure of the fluid delivered to the box 17 determines the degree of compression or compaction of the cheese curd contained by the hoops 11. This pressing procedure has long been conventional for the preparation of block cheeses. The cylindrical horn hoops of the prior art can be loaded longitudinally on their sides in the trough 12 and pressed in similar fashion, but with the difficulties and disadvantages discussed hereinbefore.

Figure 2:
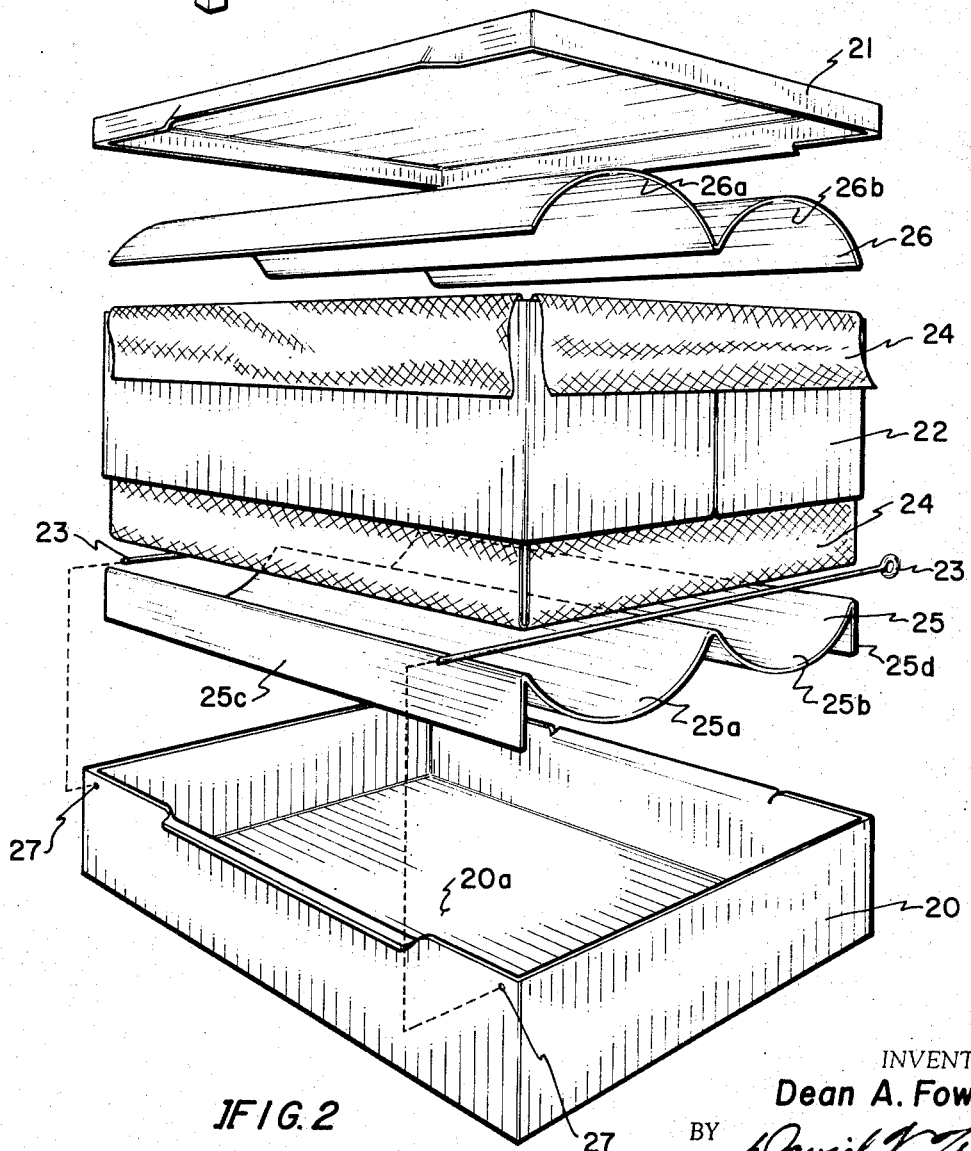
FIG. 2, an exploded pictorial illustration of one embodiment of this invention.

The rectangular horn hoop of FIG. 2 includes a bottom member 20, cover member 21, sleeve insert 22, and support pins 23 of a conventional rectangular block cheese hoop. A cheesecloth 24, similar to those used in connection with a rectangular block hoop, may be located in the same way, as shown, in the claimed horn hoop.

Conversion of the rectangular block hoop to the claimed rectangular horn hoop is accomplished by the insertion of a bottom platen member 25 and a top platen member 26. In the illustrated instance, the bottom platen member 25 includes two side-by-side concave molds 25a, 25b shaped as longitudinal cylindrical sections somewhat shorter than a semi-cylinder, and the top pressing plate 26 contains two molds 26a, 26b corresponding in size and shape and oriented to directly oppose the bottom molds 25a and 25b, respectively. Although various specific constructions are permissible, the illustrated platen structures are generally suitable. Thus, the bottom platen includes a support means 25c, 25d at each edge to rest on the floor portion 20a of the bottom member 20. The platens 25, 26 are dimensioned to slip within the sleeve 22, and the sleeve 22 is dimensioned to fit between the edges of the pressing platens and the top and bottom members as shown.

Referring to FIGS. 3 through 5, the embodiment illustrated by FIG. 2 is used by first positioning the bottom platen member 25 in the bottom member 20 as illustrated. The pins 23 are inserted through the holes 27 (FIG. 2), and the sleeve 22 is supported on the pins 23 as shown. The cheesecloth 24 is then positioned to line the inside surface of the sleeve 22 and the pressing surface comprised of the molds 25a, 25b of the bottom platen member 25. The assembled hoop is then ready for the introduction of curd.

As illustrated by FIG. 4, a predetermined quantity of curd 28 is loaded into the assembled hoop, the cheesecloth 24 is folded over the top of the curd 28, the top platen member is positioned atop the cheesecloth 24, the cover member 21 is placed over the sleeve 22 to cover the top platen member 26, and the pins 23 are withdrawn to permit the sleeve 22 to slide down between the bottom member 20 and the bottom platen member 25.

A plurality of the hoops, loaded and assembled as illustrated by FIG. 4, may be placed in a press 13 as illustrated by FIG. 1, wherein they are pressed until they compact the curd to the desired extent (FIG. 5). FIG. 5 shows how the construction of the illustrated hoop prevents overcompacting the curd. The insert sleeve 22 checks the pressing action by determining the minimum spacing between the bottom 25 and top 21 of the hoop. Even with the hoop in fully pressed condition, the bottom 20 and top 21 are slightly spaced as shown at 29. Whether or not the hoop is pressed to its maximum possible extent, the application of appropriate pressure forms, in the illustrated instance, a pressing 30 consisting of two side-by-side, approximately cylindrical pressed horns 31 (FIG. 6). The platens 25 and 26 may be deepened so that they contact each other when pressed, if it is desired to press individual unconnected horns. The hoops are held in the press until the pressings set, usually several hours or overnight.

The pressed horns 31 are cut apart, individually wrapped in a polyvinyl bag 32 (FIG. 7) and inserted in a pasteboard sleeve 33. The thus-contained horns are stored on end for appropriate periods, generally in excess of about 10 days, for aging. During the aging process, the horns assume a substantially cylindrical shape with the flat regions 34 of the pressed horns assuming a circular configuration in conformance with the internal surface of the sleeve 33.

Although the embodiment previously described is generally suitable and constitutes a substantial advance in the art, its use requires the manual placement of the adaptive members 25 and 26 in the hoop. Because these members can sometimes be forced out of position, requiring readjustment during the pressing procedure, it is often preferred to rely upon the embodiment illustrated by FIGS. 8 through 10. According to this embodiment, a top pressing platen 40 and a bottom pressing platen 41 are mounted within a top frame member 42 and a bottom frame member 43, respectively. The sleeve insert 44, cheesecloth (not shown), pins 45, and general operating procedure may be identical to the corresponding elements previously described. In practice, it is desirable for the sleeve insert 44 to be somewhat shorter than the sleeve insert 22 (FIG. 2) of the conventional rectangular block cheese hoop.

The top frame member 42 comprises a rectangular frame 46 having the same perimeter as the cover 21 (FIG. 2) of the previously described embodiment. The top pressing platen 40 is anchored to the frame 46 by means of edge members 47 connecting the inside 46a of the frame 46 with the outside edges 40a of the platen 40. The bottom frame member of the hoop 43 is similarly constructed with the bottom pressing platen 41 anchored in a frame 48 by means of the support members 49.

FIG. 9 illustrates the embodiment of FIG. 8 in fully assembled (except for the press cloth and curd) and fully pressed condition. It should be noted that the minimum, fully pressed spacing of the top platen 40 and bottom platen 41, and thus the diameter of the pressed horn, is set by the height of the sleeve 44 as illustrated by FIG. 10. The size and shape of the pressings can be adjusted to some extent by substituting sleeves of various sizes.

Reference herein to details of certain preferred embodiments is not intended to limit the scope of the claims which themselves recite those features regarded as essential to the invention.

I claim:

1. Apparatus for adapting a conventional rectangular block cheese hoop, including a boxlike bottom element, a rectilinear open ended sleeve element insertable in said bottom element, and a cover element for said insert, to produce horn cheeses, comprising:

an adapter element for said bottom element, including a base member for support on said bottom element and a pressing surface opposite said base member including a plurality of concave molds in side-by-side relationship, each such mold extending the full length of the adapter and being shaped generally as a longitudinal, no more than semicylindrical section of a cylinder; and a pressing platen member adapted for insertion into said sleeve opposite said adapter element, including a pressing surface with a plurality of concave molds corresponding in number to the concave molds of said adapter element and located to directly oppose said first-named molds when the platen member is inserted into said sleeve.

2. A cheese hoop for making horns of cheese, comprising:

a rectilinear sleeve open at both ends and having rectangular cross sections both normal and parallel said open ends;

a first platen insertable in one end of said sleeve, including at least one concave pressing mold shaped approximately as a longitudinal, no more than semi-cylindrical section of a cylinder;

a second platen insertable in the opposite end of said sleeve, including concave pressing molds corresponding in number and location and approximately in shape to those in said first platen so that when the two platens are urged toward each other through said sleeve, pairs of corresponding molds enclose approximately cylindrical volumes; and means to prevent said platens from being urged into contact with each other when said sleeve is loaded with curd and said platens are inserted in its opposite ends.

3. A cheese hoop for making horns of choose, comprising:

a rectilinear sleeve open at both ends and having rectangular cross sections both normal and parallel said open ends;

a first platen insertable in one end of said sleeve, including at least one concave pressing mold shaped approximately as a longitudinal, no more than semi-cylindrical section of a cylinder; and a second platen insertable in the opposite end of said sleeve, including concave pressing molds corresponding in number and location and approximately in shape to those in said first platen so that when the two platens are urged toward each other through said sleeve, pairs of corresponding molds enclose approximately cylindrical volumes; wherein at least one platen is mounted within a rectangular frame dimensioned to slip concentrically over one end of said sleeve so as to guide said platen into said sleeve.

4. A cheese hoop, according to claim 3, wherein each platen has two concave pressing molds in side-by-side relation so that when the sleeve is loaded with curd and the platens are urged together the curd is pressed into a connected pair of approximately cylindrical horn cheeses.

* * * * *

UNITED STATES PATENT OFFICE
CERTIFICATE OF CORRECTION

Patent No. 3,700,373          Dated October 24, 1972

Inventor(s) Dean A. Fowler

It is certified that error appears in the above-identified patent and that said Letters Patent are hereby corrected as shown below:

Col. 4, line 48, change "ran" to --ram--;

Col. 5, line 8, change "plate" to --platen--;

Col. 7, line 19, change "choose" to --cheese--.

Signed and sealed this 22nd day of May 1973.

(SEAL)
Attest:

EDWARD M. FLETCHER, JR.
Attesting Officer

ROBERT GOTTSCHALK
Commissioner of Patents